Aug. 6, 1957 W. SCHIEBEL 2,801,772
LAWN SPREADER
Filed April 22, 1955 2 Sheets-Sheet 1

INVENTOR.
William Schiebel
BY
ATTORNEY

Aug. 6, 1957  W. SCHIEBEL  2,801,772
LAWN SPREADER
Filed April 22, 1955  2 Sheets—Sheet 2

INVENTOR.
William Schiebel
BY
ATTORNEY 2,801,772

LAWN SPREADER

William Schiebel, East Stroudsburg, Pa.

Application April 22, 1955, Serial No. 503,315

3 Claims. (Cl. 222—177)

The present invention relates to a lawn spreader and may be used for even distribution of fertilizer, seeds, or the like.

It has been proposed before to provide lawn spreaders which comprise substantially a hopper having a crosswise disposed opening at its lower end, which hopper is mounted on an axle carrying two wheels in order to provide means for moving around the lawn spreader on the lawn. The axle carried in many instances an agitator which was adapted to distribute the goods from the hopper to the lawn.

It has been found, however, that the agitators used heretofore were subjected to attack and corrosion due to the used chemicals usually present in fertilizers. Furthermore, the space provided between the lower exit of the hopper and the agitator is comparatively narrow and if lumps, pebbles, or other foreign objects appear in the texture of the material to be distributed, which objects were of a size even slightly larger than the open space, these materials cake and clog the exit of the hopper, causing an irregular flow of the material and consequently poor application thereof.

It is, therefore, one object of the present invention to provide an agitator for a lawn spreader, which agitator is made of material which is non-corrosive and not subject to attack by chemicals normally contained in fertilizers, and which also further prevents the caking or clogging of the open space provided between the agitator and the exit of the hopper.

It is also another object of the present invention to provide a lawn spreader comprising a hopper having an opening at its lower end and an agitator mounted in said opening and also to provide a micrometer adjustment for the opening of said hopper.

It is a further object of the present invention to provide a lawn spreader which controls the rate of feed from the hopper, in order to maintain with precision the desired flow at each setting of the feed opening.

It is yet another object of the present invention to provide a rotary cam which sets the spreader control and adjusts the rate of feed from the spreader hopper.

With these and other objects in view, which will become apparent in the following detailed description, the present invention will be clearly understood in connection with the accompanying drawings, in which.

Figure 1:
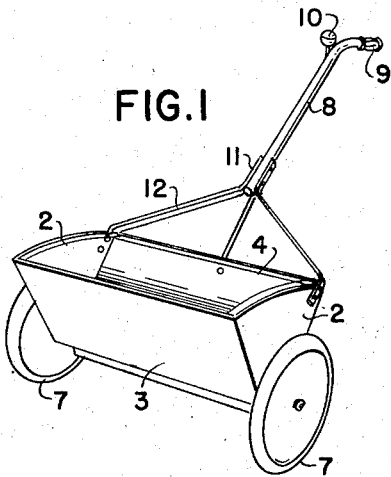
Figure 1 is a perspective front view of the lawn spreader.
Figure 2:
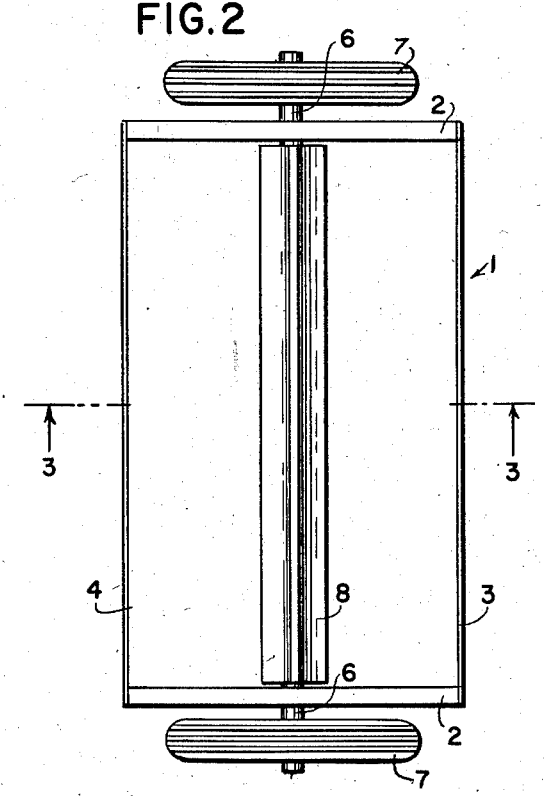
Fig. 2 is a top plan view thereof, the push-bar and adjustment means being removed for the purpose of better demonstration.
Figure 3:
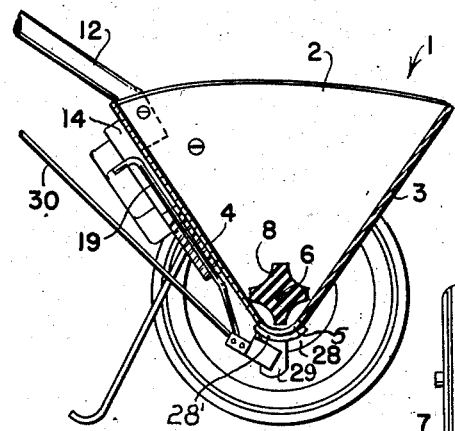
Fig. 3 is a section along the lines 3—3 of Fig. 2.
Figure 4:
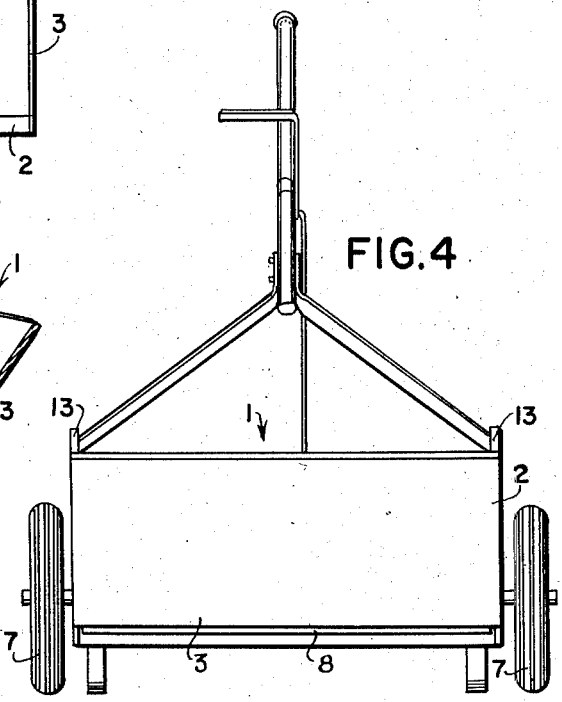
Fig. 4 is an end view thereof.

Referring now to Figs. 1 to 4 of the drawings, it will be seen that the spreader comprises an elongated hopper or receptacle 1 having end walls 2, front and rear walls 3 and 4, respectively. The bottom portion of the hopper 1 has an opening 5 through which the material is fed from the hopper 1 onto the lawn. A crosswise disposed axle 6 finds its bearings in the end walls 2 and has mounted on their respective ends wheels 7 which turn together with the axle 6. The center portion of the axle 6 is preferably of square cross-section and mounted on that portion of the axle 6 is a longitudinal agitator 8 of rubber, plastic or any other flexible material which has the properties of giving slightly upon applying sufficient pressure thereto. By this arrangement it is possible to remove any particles which may become lodged between the agitator and the wall of the hopper, due to the yielding material of the agitator and due to the possibility of removal of such particles in axial direction of said agitator.

The means for moving the spreader comprises a push-bar 8 which has at its upper end two handles 9 disposed crosswise, and one of the handles 9 has secured thereto a control lever 10 for a purpose to be disclosed below. The lower end of the push-bar 8 is received by a sleeve portion 11 of a forked member 12, the lower end portions of which are properly secured to projections 13 of the end walls 2.

Figure 6:
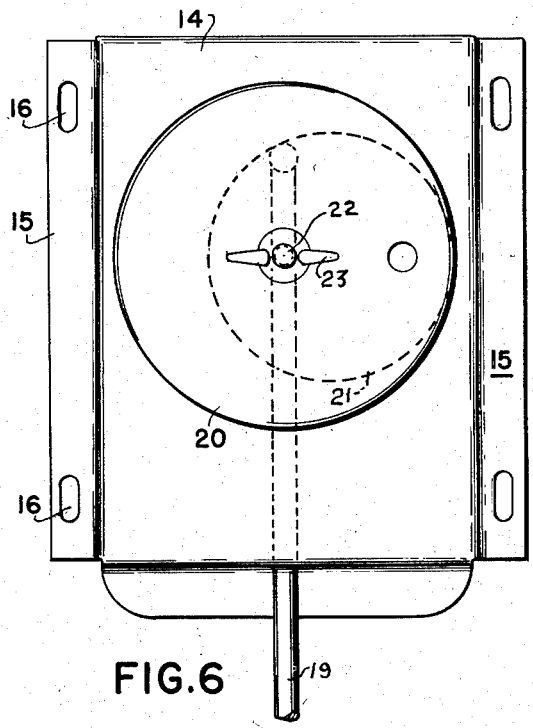
Fig. 6 is an end view of said adjustment means.
Figure 5:
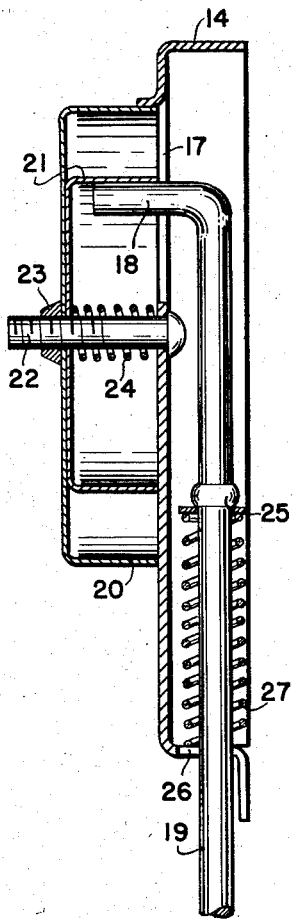
Fig. 5 is a fragmentary sectional view of the adjustment means for the spreader.
Figure 7:
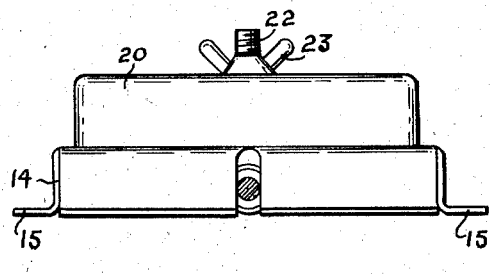
Fig. 7 is a top plan view of said adjustment means.

Referring now to Figs. 5 to 7, the micrometer adjustment comprises a hollow body 14 which has lateral flanges 15 which have openings 16 to receive screws (not shown) for attachment of the body 14 to the outer face of the rear wall 4. The body 14 has a recess 17 in which the bent end portion 18 of a lever 19 is movable to assume a plurality of adjustment positions. A cylindrical body 20 is secured to a flanged portion of the body 14 and a second cylindrical body 21 is eccentrically mounted in the body 20 by means of a screw bolt 22 inserted from the inside of the body 14 and extending outwardly through the cylindrical body 21 and retained by means of a nut 23. A helical spring 24, engaging with one end the outer face of the body 14 and with its other end the inner face of the body 21, retains the latter in engaging position with the body 20, while permitting rotation of the body 20. The lever 19 has a flanged portion 25 and projects in downward direction through an opening 26 provided in the body 14. A second helical spring 27 bearing with one end against the inner face of the body 14 and with its other end against the flange 25 urges the lever 19 into uppermost position, so that upon the position of the body 21 which operates, as a cam by turning the body 20, provides limiting means for the upward movement of the lever 19 which is thus accurately and gradually variably pre-set for the desired control of feed from the hopper 1.

A cover member 28 formed complementary to the lower portion of the hopper 2 is pivotally mounted on the axle 6 by means of a disc 28 or sector which is secured to a bracket 29 which is held in place by a rod 30, the upper end of which is secured to one of the handles 9 for axial movement thereof. The lower end of the lever 19 is likewise secured to the bracket 29, so that upon adjustment of the rod 30 the lever 19 limits in accordance with its pre-setting the required different open positions to enlarge or decrease the passage way through the opening 5 of the hopper. In order to move the control lever 10 from the closing position to a plurality of open positions of the cover member 28' the lever 19 passes from one side of a dead center position to a fixed position holding the cover member 28' in closed position to the other side of the dead center position to a plurality of open positions of the cover member, due to the fact that the spring 27 must be compressed in order to shift from the closed position of the cover member 28' to any one of its open positions.

While I have disclosed one embodiment of the present invention, it is to be understood that this embodiment

I claim:

1. In a spreader, a hopper having a handle pivoted thereto and a crosswise disposed discharge opening, the bottom of said hopper being of circular cross section, a cover member of a cross section complementary to that of said bottom and movable along the outer face of said bottom in order to close said discharge opening in one position and to open said discharge opening in a number of other set positions of said cover member, and control means for said cover member movable on one side of a dead center position to a fixed position holding said cover member in closed position and movable to the other side of said dead center to a plurality of said set open positions, an axle extending through said side walls and having wheels at its respective ends secured thereto, the portion of said axle extending between said side walls being of polygonal cross section, and an agitator of flexible material disposed adjacent said discharge opening and secured to the last mentioned portion of said axle, so that said flexible agitator turns with said axle upon moving said spreader, said control means comprising a control lever mounted on said handle and rod means connecting said control lever with said cover member, and a rotary cam member and a lever, one end of said lever being connected with said cover member and the other end of said lever engaging said rotary cam, and a spring maintaining said lever in cam engaging position in each of a plurality of open positions of said cover member on one side of dead center as well as in the closed position of said cover member on the other side of dead center.

2. The spreader, as set forth in claim 1, in which said agitator is made of rubber, in order to prevent any caking or clogging of the discharge opening of said hopper and assure continuous and even flow of material to be discharged from said hopper.

3. In a spreader, a hopper having a handle pivoted thereto and a crosswise disposed discharge opening, the bottom of said hopper being of circular cross section, a cover member of a cross section complementary to that of said bottom and movable along the outer face of said bottom in order to close said discharge opening in one position and to open said discharge opening in a number of other set positions of said cover member, and control means for said cover member movable on one side of a dead center position to a fixed position holding said cover member in closed position and movable to the other side of said dead center to a plurality of said set open positions, an axle extending through said side walls and having wheels at its respective ends secured thereto, the portion of said axle extending between said side walls being of polygonal cross section, and an agitator of flexible material disposed adjacent said discharge opening and secured to the last mentioned portion of said axle, so that said flexible agitator turns with said axle upon moving said spreader, said control means for the discharge opening of said hopper comprises a first hollow member secured to the rear wall of said hopper and a second hollow substantially circular member disposed eccentrically in said first hollow member, and resilient means for retaining the bases of both said members in engaging position and rotatable relative to each other, a first lever, the upper end of said first lever secured to said second hollow member and the lower end of said first lever being secured to said cover member, and a second lever being secured to said cover member and said handle, respectively.

References Cited in the file of this patent

UNITED STATES PATENTS

| | | |
|---|---|---|
| 2,475,381 | Erickson | July 5, 1949 |
| 2,710,116 | Juzwiak | June 7, 1955 |
| 2,718,986 | Peoples | Sept. 27, 1955 |